(12) United States Patent
Dixon et al.

(10) Patent No.: US 6,766,930 B2
(45) Date of Patent: Jul. 27, 2004

(54) STROLLER HANDLE CONTAINER

(75) Inventors: Keith Dixon, Columbus, IN (US); Zhenghuan Song, Shanghai (CN)

(73) Assignee: Cosco Management, Inc., Wilmington, DE (US)

( * ) Notice: Subject to any disclaimer, the term of this patent is extended or adjusted under 35 U.S.C. 154(b) by 22 days.

(21) Appl. No.: 10/254,341

(22) Filed: Sep. 25, 2002

(65) Prior Publication Data

US 2004/0056057 A1 Mar. 25, 2004

(51) Int. Cl.[7] .................................................. B60R 7/00
(52) U.S. Cl. ....................................... 224/409; 224/572
(58) Field of Search ................................ 224/407, 409, 224/411, 572

(56) References Cited

U.S. PATENT DOCUMENTS

| | | | | |
|---|---|---|---|---|
| 1,577,298 A | * | 3/1926 | Roeller | .......................... 224/409 |
| 3,955,728 A | | 5/1976 | Jackson et al. | |
| 4,186,859 A | * | 2/1980 | Frankfort et al. | ............ 224/579 |
| 4,248,443 A | | 2/1981 | Ohlson | |
| 4,346,912 A | | 8/1982 | Habib | |
| RE31,760 E | | 12/1984 | Kassai | |
| 4,577,903 A | | 3/1986 | Wells | |
| 4,852,778 A | | 8/1989 | Beiser et al. | |
| 4,961,522 A | * | 10/1990 | Weber | .......................... 224/585 |
| 4,974,760 A | * | 12/1990 | Miller | .......................... 224/407 |
| 5,012,963 A | * | 5/1991 | Rosenbaum | .................. 224/407 |
| D336,878 S | | 6/1993 | Graf | |
| 5,326,175 A | * | 7/1994 | Carter | ............................ 383/22 |
| 5,417,353 A | * | 5/1995 | Stall | ............................ 224/401 |
| 5,464,183 A | | 11/1995 | McConnell et al. | |
| 5,702,038 A | | 12/1997 | Miller et al. | |
| 5,704,527 A | | 1/1998 | Struzer | |
| 5,941,437 A | * | 8/1999 | Okumura | ...................... 224/585 |
| 5,988,669 A | | 11/1999 | Freese et al. | |
| D421,940 S | | 3/2000 | Gibson et al. | |
| 6,170,854 B1 | | 1/2001 | Maher et al. | |
| D452,192 S | | 12/2001 | Hartenstine et al. | |
| 2002/0056736 A1 | * | 5/2002 | Conte | .......................... 224/407 |

* cited by examiner

Primary Examiner—Stephen K. Cronin
(74) Attorney, Agent, or Firm—Barnes & Thornburg

(57) ABSTRACT

A stroller handle container includes a basket made of a pliable material and a sleeve made of a pliable material and mounted in an interior region of the basket to provide more than one receptacle accessed via a top opening into the basket. The container also includes basket support straps coupled to the basket and configured to support the basket in a predetermined location relative to a push handle of a juvenile stroller.

20 Claims, 2 Drawing Sheets

US 6,766,930 B2

STROLLER HANDLE CONTAINER

BACKGROUND AND SUMMARY

The present disclosure relates to containers, and in particular to baskets and trays mounted on handle bars. More particularly, the present disclosure relates to a console tray mounted on a stroller push handle.

Juvenile strollers include a stroller frame supported on wheels, a seat mounted on the frame, and a push handle coupled to the frame. It is now common to see a rigid tray made of plastics material mounted on the push handle in a position near the handle grip to provide a storage place for caregivers handling the stroller.

According to the present disclosure, a stroller handle container includes a basket including a pouch made of a pliable material and formed to include an interior region. A sleeve is located in the interior region of the basket to divide the interior region into more than one receptacle. The sleeve includes a side wall made of a pliable material and formed to include a first of the receptacles therein. A mount is coupled to the basket and adapted to be coupled to a push handle of a juvenile stroller to support the basket and sleeve in a suspended position with respect to the push handle.

In illustrative embodiments, the basket includes a rim made of a strap and coupled to an upper edge of the pouch to provide an opening into the interior region and the receptacles formed therein. The mount includes a vertically extending basket support strap coupled to a rear portion of the basket rim and to a push handle cross bar providing a hand grip to retain the basket in a suspended position below the cross bar and between two spaced-apart upright push handle legs extending upwardly from the stroller frame to the cross bar. The mount also includes a horizontally extending basket support strap coupled to a front portion of the basket rim and to the two spaced-apart upright legs included in the push handle to limit lateral movement of the suspended basket between the upright push handle legs.

Additional features of the present disclosure will become apparent to those skilled in the art upon consideration of the following detailed description of an illustrative embodiment exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figure 1:
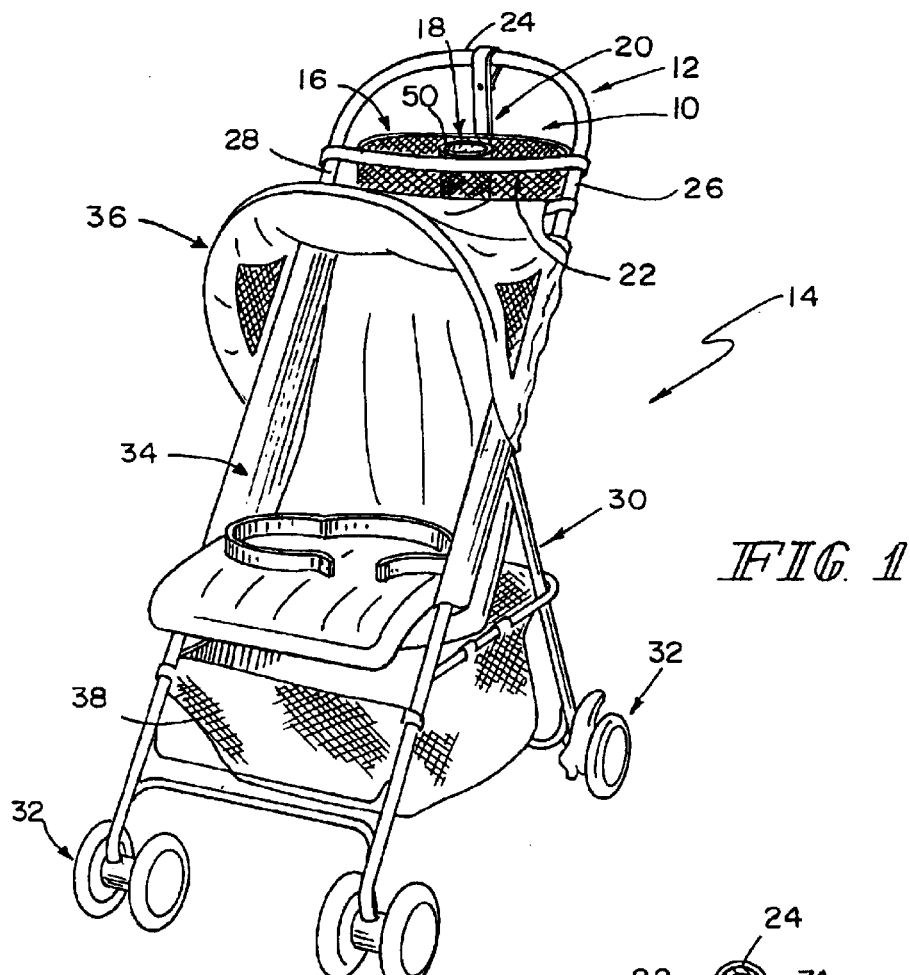
FIG. 1 is a perspective view of a stroller showing a multi-receptacle container coupled to a push handle included in the stroller.
Figure 2:
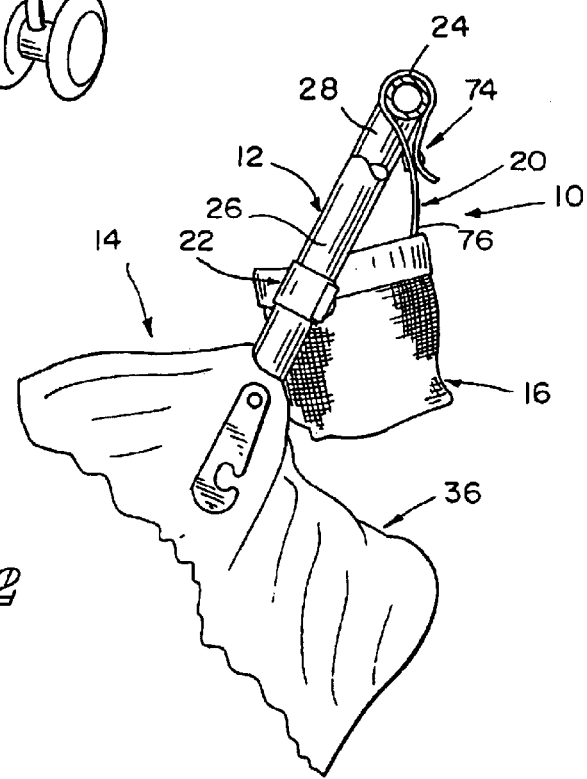
FIG. 2 is an enlarged side elevation view showing the container of FIG. 1 suspended from the cross bar on the stroller push handle to lie in a position above a stroller canopy.

A container 10 is adapted to be mounted on a push handle 12 included in a juvenile stroller 14 as shown, for example, in FIGS. 1 and 2. Container 10 includes a basket 16, a sleeve 18 arranged inside basket 16 to form, for example, three receptacles inside basket 16, and a basket mount comprising a pair of basket support straps 20, 22. The first basket support strap 20 extends vertically to retain basket 16 in a suspended position below a cross bar 24 included in push handle 12. The second basket support strap 22 extends horizontally to retain basket 16 in a tethered position between two upright legs 26, 28 included in push handle 12.

Container 10 is well-suited for use on many types of stroller push handles. For illustrative purposes, container 10 is shown in FIG. 2 in a mounted position on a juvenile stroller 14 including a stroller frame 30, wheels 32, a seat 34, a canopy 36, and an under-seat basket 38. Push handle 12 is coupled to support frame 30 in any suitable manner.

Figure 3:
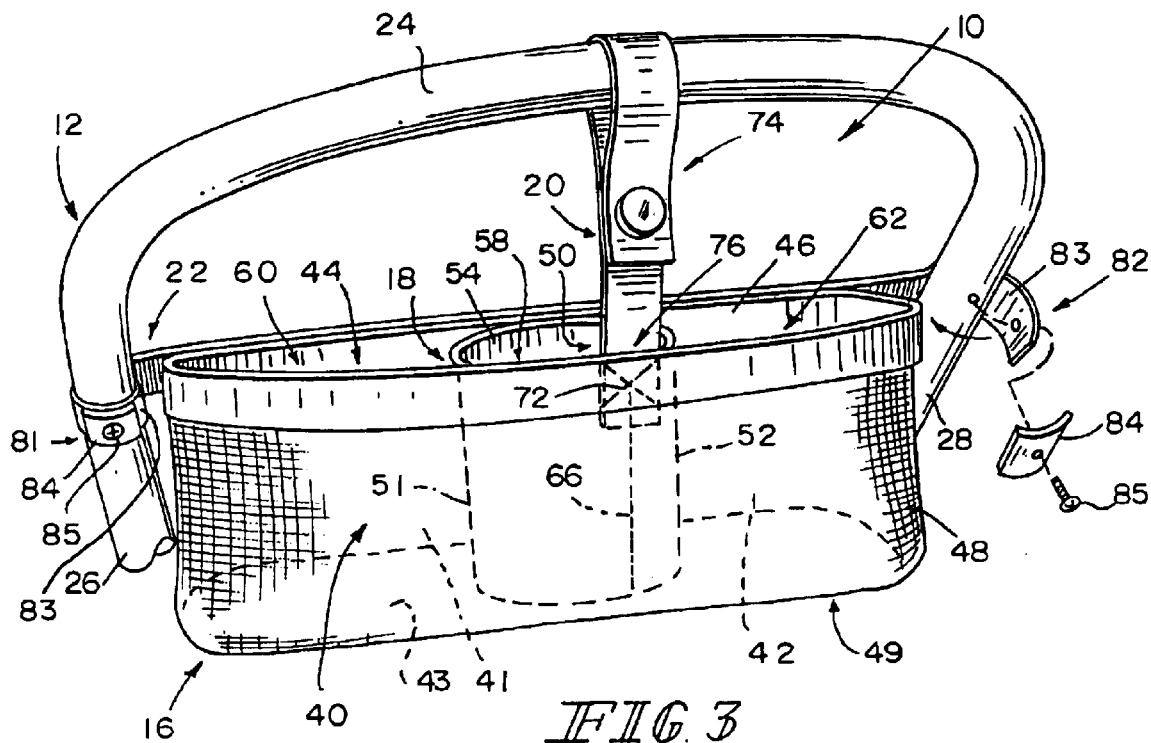
FIG. 3 is a rear perspective view of the container of FIGS. 1 and 2 showing a cylinder-shaped sleeve mounted in a fixed position in an interior region formed in a basket to partition that interior region to form three receptacles.
Figure 4:
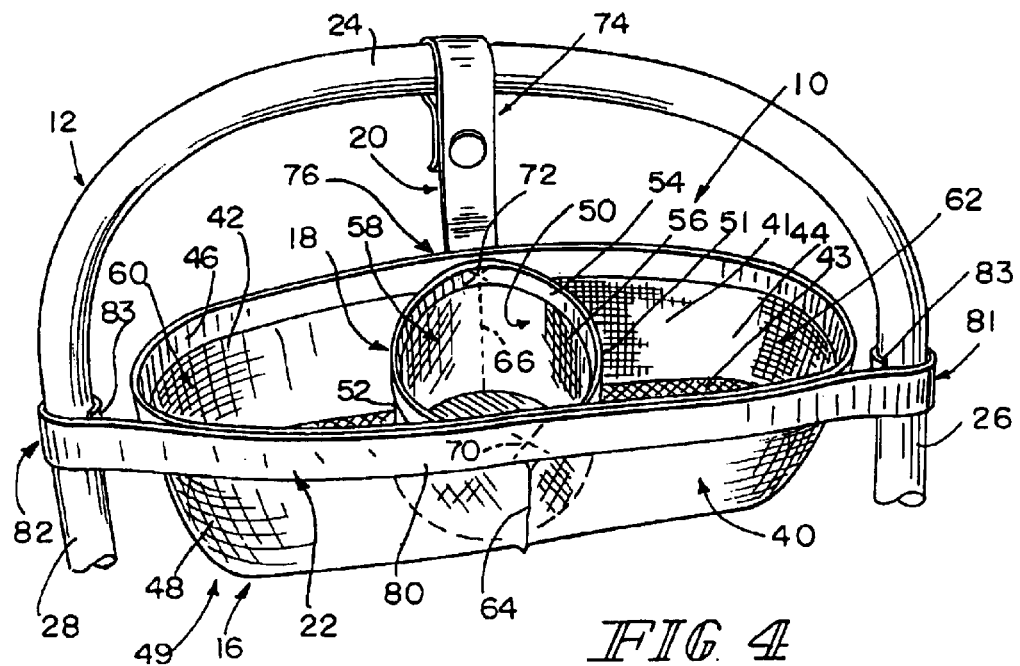
FIG. 4 is a front perspective view of the container of FIGS. 1–3 showing a horizontally extending support strap coupled to a front side of the basket to support the container in a lateral position between two legs included in the push handle and showing a vertically extending support strap coupled to a rear side of the basket to support the container in a suspended position below a cross bar included in the push handle.

Basket 16 includes a side wall 40 and a floor 43 coupled to a lower edge of side wall 40 to define an interior region 44 of basket 16 as shown, for example, in FIGS. 3 and 4. Side wall 40 includes a rim 46 made of a strap and a lower portion 48 made of a pliable material. Floor 43 is made of the same pliable material and cooperates with lower portion 48 of side wall 40 to form a pouch 49.

Sleeve 18 includes a side wall 50 that is formed to define a first receptacle 58 therein as shown, for example, in FIGS. 3 and 4. Side wall 50 includes a rim 54 made of a strap and a lower portion 56 made of a suitable pliable material. Side wall 50 is cylinder-shaped as shown in the illustrated embodiment to facilitate reception of cans, cups, and bottles (not shown) in first receptacle 58. It is within the scope of this disclosure to vary the shape of side wall 50 to influence the character, shape, and location of receptacles provided in interior region 44 of basket 16. A lower end of lower portion 56 is positioned to lie adjacent to floor 43 as shown, for example, in FIG. 4 to "close" that lower end.

In the illustrated embodiment, sleeve 18 is located in interior region 44 of basket 16 to divide the interior region 44 into more than one receptacle. A first receptacle 58 is provided inside sleeve 18. A first section 41 of basket side wall 40 cooperates with a first wall section 51 of sleeve side wall 50 to produce a second receptacle 60 inside basket 16 as suggested in FIG. 4. Likewise, a second section 42 of basket side wall 40 cooperates with a second wall section 52 of sleeve side wall 50 to produce a third receptacle 62 inside basket 16. Sleeve 18 is located in interior region 44 of basket 16 to cause first receptacle 58 to lie between second and third receptacles 60, 62.

In the illustrated embodiment, each of first and second sections 41, 42 of basket side wall 40 has a concave curved shape (resembling a U-shape) and each of first and second wall sections 51, 52 of sleeve side wall 50 has a convex curved shape. As suggested in FIG. 4, first section 41 of basket side wall 40 cooperates with first wall section 51 of sleeve side wall 50 to produce a "shield-shaped" boundary of second receptacle 60. Likewise, second section 42 of basket side wall 40 cooperates with second wall section 52 of sleeve side wall 50 to produce a shield-shaped boundary of third receptacle 62.

As suggested in FIG. 4, the U-shaped first section 41 of basket side wall 40 is "coupled" to the U-shaped second section 42 of basket side wall 40 along front and rear "junction" lines 64, 66. In practice, basket side wall 40 is monolithic.

Sleeve 18 is coupled to basket side wall 40 at point 70 along front junction line 64 and at point 72 along rear junction line 66 in the illustrated embodiment. Threads, adhesives, snaps, or other suitable connectors can be used to accomplish such coupling. It is within the scope of this disclosure to couple sleeve 18 to basket 16 at one or more locations. In the illustrated embodiment, rim 54 of sleeve 18 contacts and is coupled to rim 46 of basket 16.

Vertically extending basket support strap 20 has an upper portion 74 adapted to be coupled to cross bar 24 of push handle 12 and a lower portion 76 coupled to basket side wall 40 at or about point 72 along rear junction line 66. Upper portion 74 is arranged to wrap around cross bar 74 to form a loop receiving cross bar 74 and a snap (or other suitable connector) is used to retain upper portion 74 in a loop-forming configuration to provide means for coupling an outer portion of basket support strap 20 to cross bar 24.

Horizontally extending basket support strap 22 includes a middle portion 80 coupled to basket side wall 40 at point 70 along front junction line 64 and first and second handle mounts 81, 82 adapted to be coupled to first and second upright push handle legs 26, 28 as suggested in FIG. 4. Each handle mount 81, 82 includes, for example, an outer strap end 83, a strap retainer plate 84, and a connector 85 sized to pass through apertures formed in retainer plate 84, outer strap end 83, and a push handle leg 26 or 28 to anchor strap retainer plate 84 to one of legs 26 or 28 while one of outer strap ends 83 is trapped therebetween.

In the illustrated embodiment, container 10 is made of pliable materials and configured to be mounted on and removed from a stroller push handle quickly and easily. This container 10 can be stored in a small compartment on board stroller 14 or elsewhere when not in use owing to its pliability.

What is claimed is:

1. A stroller handle container comprising
   a basket including a side wall and a floor coupled to the side wall to define an interior region,
   a sleeve formed to include a first receptacle, the sleeve being located in the interior region to cooperate with a first section of the side wall and the floor to form a second receptacle and to cooperate with a second section of the side wall and the floor to form a third receptacle, and
   a mount coupled to the basket and to a stroller handle to support the basket and the sleeve against horizontal and vertical movement with respect to the stroller handle.

2. A stroller handle container comprising
   a basket including a side wall and a floor coupled to the side wall to define an interior region,
   a sleeve formed to include a first receptacle, the sleeve being located in the interior region to cooperate with first section of the side wall and the floor to form a second receptacle and to cooperate with second section of the side wall and the floor to form a third receptacle, and
   a mount coupled to the basket and adapted to be coupled to a stroller handle to support the basket and the sleeve in a predetermined position with respect to the stroller handle
   wherein the first section is U-shaped and the second section is U-shaped and is coupled to the U-shaped first section along front and rear junction lines and the sleeve is coupled to the side wall along at last one of the front and rear junction lines.

3. The container of claim 2, wherein the sleeve is coupled to the side wall along both of the front and rear junction lines.

4. The container of claim 2, wherein the mount includes a horizontally extending basket support strap having first and second handle mounts adapted to be coupled to a pair of spaced-apart legs included in a stroller push handle and a middle portion coupled to the side wall at the front junction line.

5. The container of claim 4, wherein the mount further includes a vertically extending basket support strap having an upper portion adapted to be coupled to a cross bar included in the stroller push handle to extend between the pair of spaced-apart legs and a lower portion coupled to the side wall at the rear junction line.

6. The container of claim 2, wherein the mount includes a vertically extending basket support strap having an upper portion adapted to be coupled to a cross bar included in the stroller push handle to extend between the pair of spaced-apart legs and a lower portion coupled to the side wall at the rear junction line.

7. The container of claim 2, wherein a portion of the floor cooperates with the sleeve to define a boundary of the first receptacle.

8. A stroller handle container comprising
   a basket including a side wall and a floor coupled to the side wall to define an interior region,
   a sleeve formed to include a first receptacle, the sleeve being located in the interior region to cooperate with first section of the side wall and the floor to form a second receptacle and to cooperate with second section of the side wall and the floor to form a third receptacle, and
   a mount coupled to the basket and adapted to be coupled to a stroller handle to support the basket and the sleeve in a predetermined position with respect to the stroller handle
   wherein the sleeve is located in the interior region of the basket to cause the first receptacle to lie between the second and third receptacles.

9. A stroller handle container comprising
   a basket including a side wall and a floor coupled to the side wall to define an interior region,
   a sleeve formed to include a first receptacle, the sleeve being located in the interior region to cooperate with a first section of the side wall and the floor to form a second receptacle and to cooperate wit a second section of the side wall and the floor to form a third receptacle, and
   a mount coupled o the basket and adapted to be coupled to a stroller handle to support the basket and the sleeve in a predetermined position with respect to the stroller handle
   wherein the first section of the side wall has a concave curved shape and a first convex curved wall section of the sleeve cooperates with the first section of the side wall to produce a shield-shaped boundary of the second receptacle.

10. The container of claim 9, wherein the second section of the side wall has a concave curved shape and a second convex curved wall section of the sleeve cooperates with the second section of the side wall to produce a shield-shaped boundary of the third receptacle.

11. A stroller handle container comprising
   a basket including a side wall and a floor coupled to the side wall to define an interior region,
   a sleeve formed to include a first receptacle, the sleeve being located in the interior region to cooperate with first section of the side wall and the floor to form a second receptacle and to cooperate with second section of the side wall and the floor to form a third receptacle, and a mount coupled to the basket and adapted to be coupled to a stroller handle to support the basket and the sleeve in a predetermined position with respect to the stroller handle wherein the side wall includes a horizontally extending rim defining an opening into the interior region an the mount includes a horizontally extending strap coupled to a front portion of the and a vertically extending strap coupled to a rear portion of the rim.

12. The container of claim 11, wherein the horizontally extending strap includes a middle portion coupled to the front portion of the rim and a pair of outer ends positioned to lie in spaced-apart relation to one another to locate the middle portion therebetween, each of said outer ends is formed to include means for coupling a portion of the horizontally extending strap to an upright leg included in a stroller push handle, and the vertically extending strap includes a lower portion coupled to the rear portion of the rim and an upper portion formed to include means for coupling the upper portion of the vertically extending strap to a horizontally extending cross bar included in a stroller push handle.

13. A stroller handle container comprising a basket including a side wall and a floor coupled to the side wall to define an interior region, a sleeve formed to include a first receptacle, the sleeve being located in the interior region to cooperate with first section of the side wall and the floor to form a second receptacle and to cooperate with second section of the side wall and the floor to form a third receptacle, and a mount coupled to the basket and adapted to be coupled to a stroller handle to support the basket and the sleeve in a predetermined position with respect to the stroller handle wherein the side all of the basket includes a horizontally extending, oval-shaped rim defining an opening into the interior region of the basket and the sleeve includes a horizontally extending, cylinder-shaped rim defining an opening into the first receptacle.

14. A stroller handle container comprising a basket including pouch made of a pliable material and formed to include an interior region and a rim made of strap and coupled to an upper edge of the pouch to provide an opening into the interior region, a horizontally extending basket support strap coupled to a front portion of the rim and formed to include means for coupling outer portions of the horizontally extending basket support strap to a stroller push handle, and a vertically extending basket support strap coupled to a rear portion of the rim and formed to include means for coupling an upper portion of the vertically extending basket support strap to a stroller push handle.

15. The container of claim 14, further comprising a sleeve including a side wall made of a pliable material and formed to include a first receptacle and a rim made of a strap and coupled to an upper edge of the side wall to provide an opening into the first receptacle and wherein the sleeve is located in the interior region of the basket.

16. The container of claim 15, wherein the rim of the sleeve is coupled to the rim of the basket to anchor the sleeve in a predetermined location in the interior region of the basket.

17. The container of claim 15, wherein the rim of the basket is oval-shaped and the rim of the sleeve is cylinder-shaped.

18. The container of claim 14, further comprising a partition arranged to divide the interior region of the basket into more than one receptacle.

19. The container of claim 18, wherein the partition is a sleeve formed to include a receptacle therein.

20. A stroller handle container comprising a basket including pouch made of a pliable material and formed to include an interior region, a sleeve including a side wall made of a pliable material and formed to include a first receptacle, the sleeve being located in the interior region of the basket to divide the interior region into more than one receptacle, and a mount coupled to the basket and adapted to be coupled to a horizontal portion and two vertical portions of a stroller handle to support the basket and sleeve in a suspended position with respect to the stroller handle.

* * * * *